(12) United States Patent
Shutsa et al.

(10) Patent No.: US 12,456,078 B2
(45) Date of Patent: Oct. 28, 2025

(54) SEARCHING LISTINGS FOR RESERVATIONS

(71) Applicant: Airbnb, Inc., San Francisco, CA (US)

(72) Inventors: Adam James Shutsa, San Francisco, CA (US); Alexis Marie Konevich, Soquel, CA (US); Clarence Chin-wei Quah, San Francisco, CA (US); Fnu Dishant, Fremont, CA (US); Judith Dito, San Francisco, CA (US); Kidai Kwon, Santa Monica, CA (US); Phanindra Ganti, Los Altos, CA (US); Xu Zhao, Seattle, WA (US); Rohit Girme, Fremont, CA (US); Shanni Weilert, San Jose, CA (US); Soumyadip Banerjee, Burlingame, CA (US); Surbhi Sethi, San Francisco, CA (US); Vivek Bhardwaj, San Jose, CA (US); Wen Mi, Sunnyvale, CA (US); Walker John Alexander Henderson, Philadelphia, PA (US); Ying Xiao, Sammamish, WA (US); Yonghua Xu, Issaquah, WA (US)

(73) Assignee: Airbnb, Inc., San Francisco, CA (US)

( * ) Notice: Subject to any disclaimer, the term of this patent is extended or adjusted under 35 U.S.C. 154(b) by 272 days.

(21) Appl. No.: 18/140,721

(22) Filed: Apr. 28, 2023

(65) Prior Publication Data
US 2024/0362545 A1    Oct. 31, 2024

(51) Int. Cl.
*G06Q 10/02*    (2012.01)
*G06Q 30/0601*    (2023.01)

(52) U.S. Cl.
CPC ......... *G06Q 10/02* (2013.01); *G06Q 30/0643* (2013.01)

(58) Field of Classification Search
CPC ...... G06Q 10/025; G06Q 50/14; G06Q 50/12; G06Q 30/0205; G06Q 30/0627; G06F 16/29; G06F 3/0482
See application file for complete search history.

(56) References Cited

U.S. PATENT DOCUMENTS

2016/0225108 A1* 8/2016 Fishberg ............ G06Q 30/0283
2016/0379321 A1* 12/2016 Abraham ............ G06F 16/248
    705/26.63

(Continued)

OTHER PUBLICATIONS

Wang, Xin Shane, Jiaxiu He, and Rajdeep Grewal. Image features and demand in the sharing economy: A study of airbnb. Working Paper, 2020. (Year: 2020).*

*Primary Examiner* — Ismail A Manejwala
(74) *Attorney, Agent, or Firm* — Schwegman Lundberg & Woessner, P.A.

(57) ABSTRACT

A system that enables searching for listings for accommodation reservations is described. The system receives, by a network site of a listing network platform, input comprising search criteria and identifies a plurality of listings matching the search criteria. The system generates a graphical user interface comprising a plurality of graphical objects each associated with a respective one of the identified plurality of listings. The system determines that the search criteria satisfies an amenity criterion and, in response, causes one or more amenities associated with an individual listing of the identified plurality of listings to be presented in an individual graphical object of the plurality of graphical objects associated with the individual listing.

18 Claims, 11 Drawing Sheets

(56) References Cited

U.S. PATENT DOCUMENTS

| | | | | |
|---|---|---|---|---|
| 2017/0017906 A1* | 1/2017 | Roytblat | ............ | G06Q 30/0207 |
| 2017/0103351 A1* | 4/2017 | Zhang | ................. | G06Q 10/025 |
| 2020/0394728 A1* | 12/2020 | Fishberg | ................ | G06Q 10/02 |
| 2023/0121288 A1* | 4/2023 | Handler | ................ | G06Q 10/02 |
| | | | | 705/5 |

* cited by examiner

400 ↘

| Amenities in Priority Order 410 | When the Amenity will be Shown 420 |
|---|---|

Monthly Amenities ～430

| | |
|---|---|
| Verified Fast Wifi | Monthly 432 |
| Dedicated Workspace | Monthly |

Only May Appear if 1+ Amenity above is Present: 434

| | |
|---|---|
| EV Charger | Monthly |

Family-Friendly Amenities 440

| | |
|---|---|
| Crib | Infant |
| Travel Crib 450 | Infant 452 |
| High Chair | Infant |
| Playroom 460 | Children 462 |
| Playground | Children |
| Mini Golf | Children |
| Bowling | Children |
| Home Theater | Children |
| Arcade Machine | Children |
| Ping Pong | Children |
| Game Consoles | Children |
| Books and Toys | Children |

Only May Appear if 1+ Amenity above is Present: 570

| | |
|---|---|
| Changing Table 572 | Infant |
| Baby Bath | Infant |
| Kids Bike | Children |
| Board Games | Children |
| Baby Monitor | Infant |

*FIG. 4*

SEARCHING LISTINGS FOR RESERVATIONS

TECHNICAL FIELD

The present disclosure generally relates to special-purpose machines that manage data processing and improvements to such variants, and to the technologies by which such special-purpose machines become improved compared to other special-purpose machines for searching a property listings site for reservations.

BACKGROUND

Network site users can create content for viewing and interaction by other network site users (e.g., booking, registering, subscribing, viewing of listings). The posted content can be updated, created, or deleted, and it can be computationally challenging for a network site to return valid search results to network site users searching for content (e.g., listings for reservations) with specified parameters (e.g., dates, categories, prices, quantity). For example, if there are a large number of users posting and updating content and also a large number of users submitting complex searches for the posted content, any delay in computation due to query complexity may cause inaccurate results to be returned and cause large computational resource consumption (e.g., processing, memory, network overhead).

BRIEF DESCRIPTION OF THE DRAWINGS

Various ones of the appended drawings merely illustrate example embodiments of the present disclosure and should not be considered as limiting its scope.

FIGS. 4-8 show example configurations of a listing search system, according to some examples.

DETAILED DESCRIPTION

Figure 1:
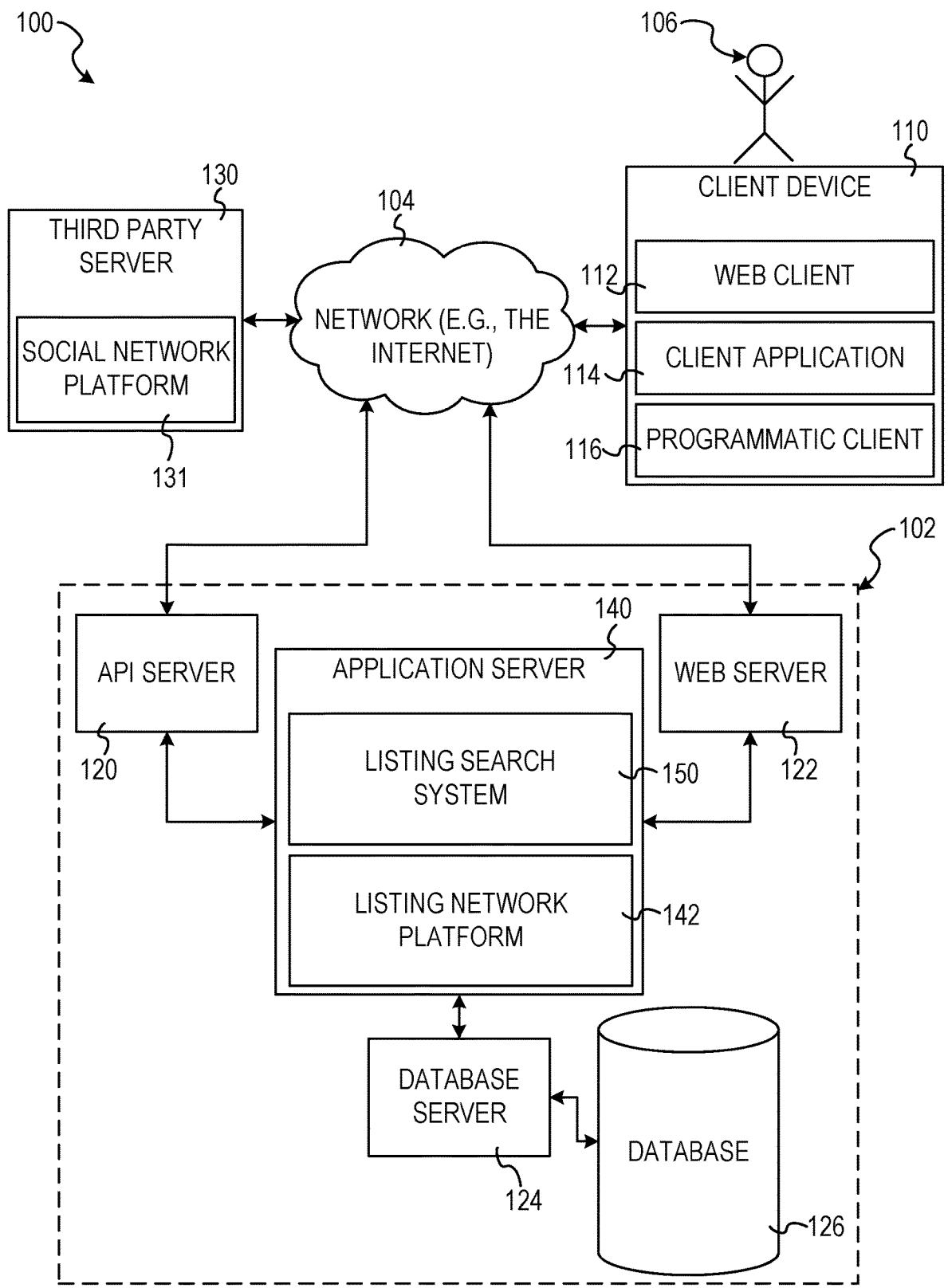
FIG. 1 is a block diagram illustrating a search and display system implemented in a networked environment, according to some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed above, it can be difficult to return up-to-date results for complex queries for content posted on a network site. In addition, navigating the vast array of content available on the network site can be very complex and time consuming. Such navigation can entail browsing multiple pages of information to find a suitable result or action. To this end, a search and display system can be configured to efficiently search for complex queries, allow browsing of a network site, and return accurate results and perform requested actions with low computational resource usage. Although in the following discussion the example posted content are accommodations listings (e.g., listings for reservations) posted on a network site for searching and interacting with other end users, other types of network site content posted by end users and searched for by other end users can likewise be implemented in the search and display system processes and methods, such as transportation, experiences, and/or events.

Generally, a listing platform can be searched for result listings that are available for a specified date range, price range, and/or other attributes (amenities, cancelation policy, etc.), which can be specified in a given query (e.g., text field, drop-down menu, checkbox filters). To search and browse the listing platform, users can access the listing platform on a particular user interface channel, such as by phone or through an application associated with the listing platform.

While some of the listing attributes are relatively static and common across the potential results and therefore fast to look up, pricing and date availability are highly dynamic because (1) pricing and date availability change frequently (e.g., the host of a listing updates an availability calendar, dynamic pricing changes due to demand and supply), and (2) the price and date availability attributes have a higher accuracy burden (e.g., searching end users have a low tolerance for pricing discrepancies). To address these issues, price and date availability attributes are handled at search time in response to handling each new query received through a particular user interface channel. This can consume a significant amount of computational resources. For example, the process of computing pricing and availability per listing can consume over 30% of search-serving CPU processing for regular queries (e.g., simple date range, finite price range, small geographic area).

Sometimes, these systems can use up the computational resources to find matching listings and may end up failing to identify a sufficient number of candidate matches. Such systems usually present search results in a particular ranked order using tiles representing each search result. The configuration of the tiles and the content presented in the tiles is usually the same so that the same information is available for a user to review for each corresponding result. The results presented to the user in this manner can therefore be minimal, which may cause the user to manually adjust search parameters in an attempt to find better matches. Namely, the display of the results is usually not tailored in any specific manner to draw a user's attention to one result over another. Once the search parameters are ultimately updated, the revision of the search parameters causes the systems to again consume a great deal of computational resources to find match results some of which may have been initially available in the initial search but not identified by the user because of lack of information contained in the corresponding tile for the result. In many cases, users may still be unsatisfied with the matches that are returned and may decide to manually shorten or extend the duration of stay. Such repetitive and manual processes are incredibly time consuming and can be very frustrating to end users. This can result in missed opportunities and wasted computational resources.

Also, certain systems improve a user's search query by providing autocomplete suggestions in real time. However, these suggestions are usually driven by keywords in the query and some ranking information but are usually not presented in a way that is helpful to the user or that drives the user to select one suggestion over another.

To address these technical problems, the disclosed techniques provide a network site that allows a user to interact with the listing network site and view search results in an efficient manner. Namely, the network site can receive input that includes search criteria and identifies a plurality of listings matching the search criteria. The network site can generate a graphical user interface that includes a plurality of graphical objects (e.g., tiles) each associated with a respective one of the identified plurality of listings. The network site can determine that the search criteria satisfy an amenity criterion. In such cases, the network site can in response, cause one or more amenities associated with an individual listing of the identified plurality of listings to be presented (visually distinguished or highlighted) conditionally in an individual graphical object of the plurality of graphical objects associated with the individual listing. Namely, the presentation of one or more amenities in the tiles for matching listings can be conditioned on whether the search criteria or attributes associated with the search criteria satisfy an amenity criterion.

This can help the user easily identify and select listings that may be of interest by highlighting those listings or tiles for such listings that may include amenities that satisfy a user's needs based on the search query. In this way, the network site can prevent having to execute additional search queries or refining an initial search query. This, in effect, reduces the amount of computational resources needed to be dedicated and consumed by a given searching end-user which frees up such resources for other tasks and satisfying other search requests.

With reference to FIG. 1, an example of a high-level client-server-based network architecture 100 is shown. A networked system 102, in the example form of a network-based listing services system, provides server-side functionality via a network 104 (e.g., the Internet or wide area network (WAN)) to one or more client devices 110. In some implementations, a user (e.g., user 106) interacts with the networked system 102 using the client device 110.

FIG. 1 illustrates, for example, a web client 112 (e.g., a browser), a client application(s) 114, and a programmatic client 116 executing on the client device 110. The client device 110 includes the web client 112, the client application(s) 114, and/or the programmatic client 116 alone, together, or in any suitable combination. Although FIG. 1 shows one client device 110, in other implementations, the network architecture 100 comprises multiple client devices.

In various implementations, the client device 110 can include a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box (STB), network personal computer (PC), mini-computer, and so forth. In an example, the client device 110 includes one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof. In communicating with the network 104 through the first user interaction channel, the client device 110 may only send audio or voice data to the network 104. In communicating with the network 104 through the second user interaction channel, the client device 110 may send data representing selections on a GUI, image content, and/or audio or voice data to the network 104.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, e-commerce site apps (also referred to as "marketplace apps"), and reservation applications for temporary stays or experiences at hotels, motels, or residences managed by other end users (e.g., a posting end user who owns a home and rents out the entire home or private room). In some implementations, the client application(s) 114 include various components operable to present information to the user and communicate with the networked system 102. In some examples, if the e-commerce site application is included in the client device 110, then this application is configured to locally provide the user interface and at least some of the functionalities with the application configured to communicate with the networked system 102, on an as-needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

The web client 112 accesses the various systems of the networked system 102 via the web interface supported by a web server 122. Similarly, the programmatic client 116 and client application(s) 114 accesses the various services and functions provided by the networked system 102 via the programmatic interface provided by an Application Program Interface (API) server 120.

Users (e.g., the user 106) can include a person, a machine, or other means of interacting with the client device 110. In some examples, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104 by way of the second user interaction channel. In this instance, the networked system 102, in response to receiving the input from the user 106, communicates information to the client device 110 via the network 104 to be presented to the user 106. In this way, the user 106 can interact with the networked system 102 using the client device 110. As another example, the user 106 provides input (e.g., speech input) to the client device 110 and the input is communicated to the networked system 102 via the network 104 in the form of audio packets or audio data.

The API server 120 and the web server 122 are coupled to, and provide programmatic and web interfaces respectively to, one or more application server(s) 140. The application server(s) 140 may host a listing network platform 142 and a listing search system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example, the database(s) 126 are storage devices that store information to be posted (e.g., inventory, image data, catalog data) to the listing network platform 142. The database(s) 126 also stores digital goods information in accordance with some examples.

Additionally, a social network platform 131 is illustrated as executing on third-party server(s) 130. Further, the social network platform 131 can programmatically access the networked system 102 via the programmatic interface provided by the API server 120. The social network platform 131 may include a social network website, messaging platform, and one or more APIs. In some examples, the electronic message discussed below is a message sent to a given user via the social network platform 131 messaging system (e.g., social media chat message, post, ping (a "hello" notification), and so on).

The listing network platform 142 provides a number of publication functions and listing services to the users who access the networked system 102. While the listing network platform 142 is shown in FIG. 1 to form part of the networked system 102, it will be appreciated that, in alternative examples, the listing network platform 142 may form part of a web service that is separate and distinct from the networked system 102.

While the client-server-based network architecture 100 shown in FIG. 1 employs a client-server architecture, the disclosed techniques are not limited to such an architecture, and can equally be implemented in a distributed, or peer-to-peer, architecture system, for example. The various systems of the applications server(s) 140 (e.g., the listing network platform 142 and listing search system 150) may also be implemented as standalone software programs, which do not necessarily have networking capabilities.

The listing network platform 142 can be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components access one or more database(s) 126 via the database server(s) 124. The listing network platform 142 provides a number of publishing and listing mechanisms whereby a seller (also referred to as a "first user," posting user, host) may list (or publish information concerning) goods or services for sale or barter, a buyer (also referred to as a "second user," searching user, guest) can express interest in or indicate a desire to purchase or barter such goods or services, and a transaction (such as a trade) may be completed pertaining to the goods or services.

Figure 2:
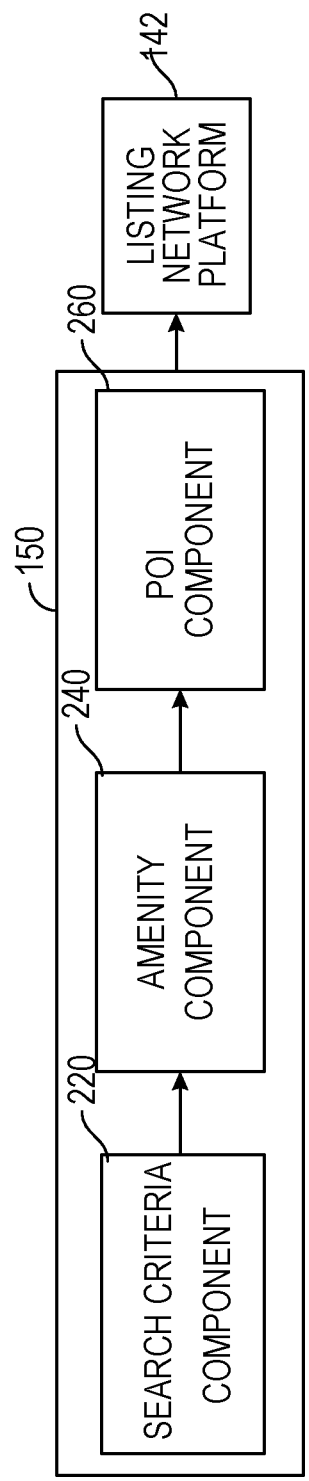
FIG. 2 shows an example of functional engines of a search and display system, according to some examples.

FIG. 2 shows example functional engines of the listing search system 150, according to some examples. As illustrated, the listing search system 150 includes a search criteria component 220, an amenity component 240, and a point-of-interest (POI) component 260. In some examples, a user may desire to perform some action with the listing network platform 142. For example, the user may desire to search for a listing for a reservation, modify one or more reservations held by the listing network platform 142, list a reservation on the listing network platform 142, communicate with a host of a listing on the listing network platform 142, request a refund for a reservation on the listing network platform 142, pay for services on the listing network platform 142, and/or to perform any other available function on the listing network platform 142.

In such cases, a user may initiate contact with the listing network platform 142 through any number of user interaction channels. For example, the user can establish a first user interaction channel with the listing network platform 142 by placing a telephone call using the client device 110 to a service phone number associated with the listing network platform 142. In response to receiving the telephone call, the listing network platform 142 can search a database that associates a telephone number of the client device 110 with an account of the user on the listing network platform 142. As another example, the user can initiate contact with the listing network platform 142 by accessing a GUI associated with the listing network platform 142. Through the GUI, the user can input search criteria by typing in characters of a string that is used to search listings on the listing network platform 142. In some examples, the search criteria are supplied or transmitted from the client device 110 to the search criteria component 220.

The search criteria component 220 can process the search criteria and can perform a search of the listings information stored in the listing network platform 142 to identify a plurality of listings that match the search criteria. The search criteria can be input by select certain drop down options. For example, the search criteria can define various attributes, such as a quantity of adults, a quantity of children and/or their respective ages, a minimum and/or maximum duration of stay, and so forth.

In some examples, the search criteria component 220 can continuously monitor characters that are being typed into the GUI of the client device 110. The search criteria component 220 can continuously search a list of POIs based on one or more partially complete words of the search criteria as the search criteria is being input. The search criteria component 220 can search different types of POIs and organize the different types of POIs into a window for presentation to a user of the client device 110. In this way, as the user types in characters of the search criteria, preliminary results are presented to the user to allow the user to autocomplete the search criteria. For example, if the user is typing in the word "pari," the search criteria component 220 can initiate a search for the POIs and identify a plurality of POIs associated with a portion of the incomplete word that is typed in "pari" corresponding to the complete word "Paris."

For example, the search criteria component 220 can communicate the incomplete word to the POI component 260. The POI component 260 can identify a first set of POIs of a first type, such as a location (e.g., a city name, a popular or trending street address, a country name, and so forth) associated with the portion of the incomplete word. Concurrently, the POI component 260 can identify a second set of POIs of a second type, such as a landmark (e.g., a historical site, museum, a popular restaurant, a theater, and so forth) associated with the portion of the incomplete word. Concurrently, the POI component 260 can identify a third set of POIs of a third type, such as trending home styles (e.g., a mansion, a mini home, a mobile home, and so forth) associated with the portion of the incomplete word. The POI component 260 can provide that list of POIs back to the search criteria component 220. The search criteria component 220 can generate a window that is divided into a plurality of regions each associated with a different type of POI. The search criteria component 220 can present the window adjacent to the search input region of the client device 110 from which the incomplete word has been received. The window can present to the user the first, second, and third types of POIs associated with the incomplete word and organized into the different regions of the window.

In some cases, the search criteria component 220 can rank each of the first, second, and third sets of POIs in each region of the window based on various criteria. For example, the search criteria component 220 can rank the first set of POIs based on a first set of criteria, such as a plurality of factors including any one or combination of trending information associated with each of the one or more POIs, quantity of bookings or viewings of listings within a threshold distance of the one or more POIs, quantity of available listings within the threshold distance of the one or more POIs, or a user profile. For example, the search criteria component 220 can rank the second set of POIs based on a second set of criteria, such as a plurality of factors including any one or combination of trending information associated with each of the one or more POIs, quantity of bookings or viewings of listings within a threshold distance of the one or more POIs, quantity of available listings within the threshold distance of the one or more POIs, or a user profile. For example, the search criteria component 220 can rank the third set of POIs based on a third set of criteria, such as a plurality of factors including any one or combination of trending information associated with each of the one or more POIs, quantity of bookings or viewings of listings within a threshold distance of the one or more POIs, quantity of available listings within the threshold distance of the one or more POIs, or a user profile.

In some examples, the search criteria component 220 can select a top number of POIs from each of the first, second, and third sets. The search criteria component 220 can present only the top number of POIs from each of the first, second and third sets in the respective regions of the window.

The search criteria component 220 can also present a search results region in the GUI. The search results region can present a list of graphical objects each associated with a respective one of the identified plurality of listings. The graphical objects can include detailed information about each listing that matches the search criteria, such as an image, video, description, and so forth. The search criteria component 220 can access the amenity component 240 to control selectively and conditionally presenting one or more amenities within one or more of the graphical objects in the GUI.

For example, the search criteria component 220 can retrieve an amenity criterion from the amenity component 240. The search criteria component 220 can compare one or more of the search attributes from the search criteria to the amenity criterion. If the search attributes satisfy the amenity criterion, the search criteria component 220 can activate display of a particular amenity for presentation in a given graphical object for which a corresponding listing includes the particular amenity or is associated with the particular amenity. For a second graphical object for which the corresponding listing excludes the particular amenity or is not associated with the particular amenity, the search criteria component 220 can prevent displaying the particular amenity in the second graphical object. In some examples, the search criteria component 220 can visually highlight (e.g., present a border or present the corresponding graphical object in a different color from other graphical objects) a particular graphical object that is associated with a listing that includes the particular amenity in response to determining that the search attributes satisfy the amenity criterion. This can be performed in addition to, or alternative to, presenting the amenity (amenity indicator and/or identifier) in the graphical object.

Figure 3:
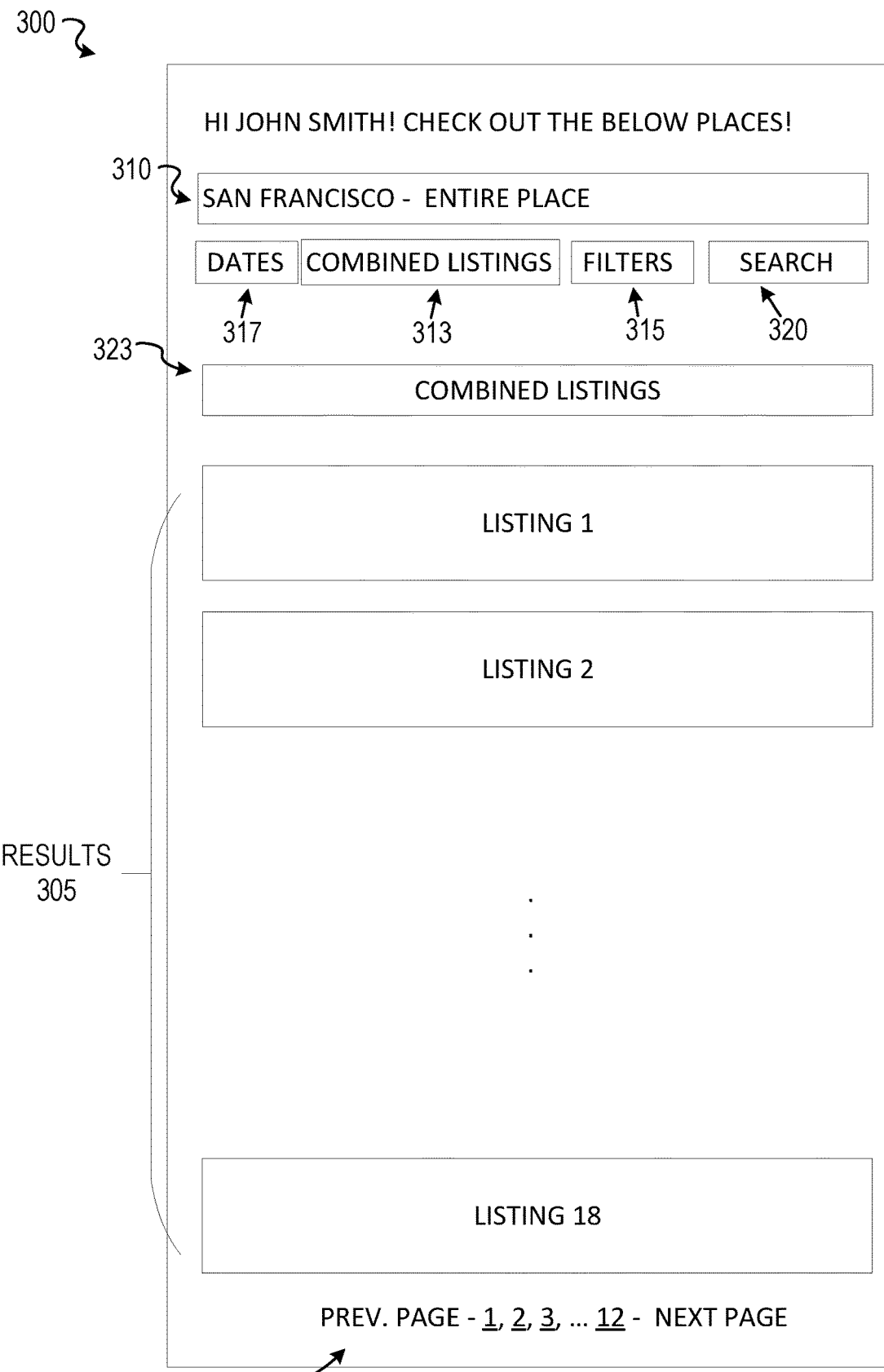
FIG. 3 shows a listings network site user interface generated by the listing network platform and search and display system (or listing search system), according to some examples.

FIG. 3 shows a listings network site user interface 300 (e.g., mobile application user interface, web browser user interface) generated by the listing network platform 142 and listing search system 150, according to some examples. The user interface 300 can be presented by the programmatic client 116 implemented on the client device 110. As illustrated, the user interface 300 includes a search field 310, a filters menu element 315 (e.g., place type, amenities), and a search button 320. The user enters a listings query into the search field 310, such as a search for temporary housing in San Francisco, and a category limitation from the filters menu element 315 of "Entire Place" (e.g., the user seeks to rent the entire residence for said dates, as opposed to renting a private room in another person's residence). The user can customize the query directly using terms input into the search field 310 or filters listed via selection of the filters menu element 315. Further, the user can select dates using the dates drop-down element 317 to select a specific date range for the temporary stay. For example, the user can select the dates drop-down element 317 and a pop-up calendar (not depicted in FIG. 3) to specify the stay in San Francisco is to be specifically from Jul. 16, 2021 to Jul. 18, 2021. In some cases, the user can provide one or more attributes of the search query using the filters menu element 315, such as specifying ages of children and minimum/maximum duration of stay.

Upon submitting the query (e.g., via selection of the search button 320, or automatically upon selecting the combined listings element 313 (split stays option) or dates drop-down element 317, a communication is sent from the programmatic client 116 to the listing search system 150. The listing search system 150 generates an output that includes a results display of the listings (e.g., graphical objects) matching the query and transmits the output via the second user interaction channel 230 to the programmatic client 116.

The results are then displayed in the listings results area 305 using respective graphical objects (also referred to as indicators of listings). The user can then select the graphical objects for the listings or navigate to additional pages via page navigational elements 325. In some examples, the user interface 300 includes a set of combined listings 323 together with individual listings displayed in the results area 305. The combined listings 323 can be positioned within the display in a dedicated area, on top of the individual listings, between two individual listings, and/or underneath the individual listings. In some examples, the combined listings 323 are provided in response to receiving input that selects the combined listings element 313. In some examples, the combined listings 323 are presented automatically without receiving input that selects the combined listings element 313.

In some examples, the combined listings 323 are displayed in different slots or portions of the display relative to other individual listings on the basis of the type of client device being used to access the system. For example, on a mobile device, the combined listings 323 can be placed in slots 3, 6, 9, and 12 on the first page, and on a desktop computer, the same combined listings 323 may be presented in slots 5, 9, 14 and 20 for better visual balance. As referred to herein, the term "slots" means an area of a display in which a category is presented. In some cases, the combined listings 323 are excluded from being presented for last minute stays, such as if the travel dates are within 48 hours of check in or starting the trip. In some examples, the combined listings 323 include individual listings of destinations or stays that are at least two hours driving distance apart but no more than 10 hours driving distance apart. In some examples, the combined listings 323 excludes repeating pairs of the same individual listings. In some examples, the combined listings 323 relate to pairs of individual listings from different neighborhoods and locations. In such cases, neighborhoods and listings can be repeated across pairs of combined listings 323.

Using a specific example, a listing request can be received for a one-month stay in Kauai specifying beachfront homes. In this example, the user 210 identifies only three individual listings that meet these search parameters but identifies ten additional stays as combined listings 323. The combined listings 323 can represent opportunities to experience different sides of the island throughout the trip and can include an option to split time between two cities (e.g., Koloa and Hanalei), split time between two other cities (e.g., Koloa and Lihue), split time between two listings that are 1 mile apart in Koloa, split time in related cites (e.g., Poipu and Princeville) and/or related cities (e.g., Lihue and Princeville), and so forth. The result of selecting the combined listings element 313 or the user 210 automatically identifying combined listings without having a combined listings element 313 can provide 40% more unique inventory for the user to select that would be excluded if only individual listings were presented.

In some examples, the combined listings 323 presentation can vary based on the type of category selected. For example, if a national parks category is selected, the combined listings 323 can include two different national park points of interest that are at least two hours' drive apart and a maximum of 10 hours' drive apart. In some cases, if the national parks are very remote, they can still be paired even if their distances exceed these thresholds. The combined listings 323 graphical representation can visually identify the two national park listings that form part of the same combined listing without specifying the region/city name. As another example, if a surfing category is selected, two different surfing destinations can be selected that are two hours' drive apart and a maximum of 10 hours' drive apart. The combined listings 323 graphical representation can visually identify the two surfing destinations that form part of the same combined listing using the region/city name.

In some examples, the combined listings 323 are conditionally presented on the basis of the length of time of the travel dates specified by the user. For example, the user 210 can determine that the length of stay of a listing request is between 14 nights and 120 nights. In such cases, the user 210 automatically generates combined listings 323 for presentation to the user along with individual listings. In some cases, if the duration is between 60 and 120 nights, each individual listing included in the combined listings 323 can be limited to having a maximum availability of 60 nights. Namely, the combined listings 323 includes individual listings that are exactly 60 nights each.

In some examples, the user interface 300 selectively and conditionally presents amenity indicators for one or more graphical objects that are displayed. For example, the search criteria component 220 can communicate one or more attributes of search criteria to the amenity component 240. The amenity component 240 can access an amenity criterion and indicate whether the one or more attributes satisfy the amenity criterion. If so, the amenity component 240 can identify to the search criteria component 220 which amenities correspond to the amenity criterion that has been satisfied by the one or more attributes. The search criteria component 220 can then access listing information for each listing that matches the search criteria to determine whether any one or more of the listing information includes the amenities provided by the amenity component 240. The search criteria component 220 can determine that a first listing representing by a first graphical object in the user interface 300 is associated with listing information that includes one or more amenities of the amenities provided by the amenity component 240. In such cases, the search criteria component 220 can visually distinguish the first graphical object from other graphical objects in the results area 305. In some cases, the search criteria component 220 can add an identifier of indicator of each or a subset of the amenities provided by the amenity component 240 that are included in the listing information for the first graphical object.

In some examples, the amenity component 240 can store a database or table that lists search attributes associated with one or more corresponding amenities. FIG. 4 shows an example table 400 used by the amenity component 240 to determine whether an amenity criterion is satisfied, according to some examples. The table 400 includes a list of amenities 410 (or amenity types) and a corresponding or associated list of search attributes 420. For example, a first set of amenities 430 (or amenity types) can be associated with a first set of search attributes 432. The first set of amenities 430 can represent amenities suitable for durations of stay or lengths of stay that transgress a minimum threshold (e.g., are longer than 3 weeks or a month). In this case, the first set of search attributes 432 can represent the minimum threshold. The amenity component 240 can receive the search attribute from the search criteria component 220 and can determine whether or not the search attribute includes a minimum length of stay that corresponds to the first set of search attributes 432. If so, the amenity component 240 can determine that the search attribute received from the search criteria component 220 satisfies the amenity criterion associated with presentation of the first set of amenities 430. The amenity component 240 can, in response, provide the list of first set of amenities 430 back to the search criteria component 220.

The search criteria component 220 can then compare the first set of amenities 430 with a list of amenities available or associated with listing information for each listing that matches the search criteria. The search criteria component 220 can determine that a first listing is associated with listing information that includes a first amenity in the first set of amenities 430. The search criteria component 220 can then include a representation or indicator of the first amenity in a graphical object that represents the first listing. Similarly, the search criteria component 220 can determine that a second listing is associated with listing information that includes a second amenity in the first set of amenities 430. The search criteria component 220 can then include a representation or indicator of the second amenity in a graphical object that represents the second listing.

In some examples, the table 400 can include one or more additional amenities 434 that are associated with the first set of search attributes 432. The one or more additional amenities 434 can be provided to the search criteria component 220 with a condition for presenting the one or more additional amenities 434. For example, the condition can specify that a representation and/or indicator of the one or more additional amenities 434 can be included in a given graphical object for a listing if the listing is associated with listing information that includes one or more of the first set of amenities 430. For example, if the first listing is determined to include the first amenity, the search criteria component 220 can determine if the first listing also include a second amenity corresponding to the one or more additional amenities 434. If so, the search criteria component 220 can then present an additional indicator or representation for the second amenity together with the indicator or representation of the first amenity in the graphical object.

As another example, the search criteria component 220 can determine that a third listing (of the listings matching the search criteria) is associated with listing information that includes an amenity matching the one or more additional amenities 434 but does not include any amenity that matches the first set of amenities 430. In such cases, the search criteria component 220 can exclude the indicator or representation of the amenity matching the one or more additional amenities 434 in the results display.

For example, a second set of amenities 440 (or amenity types) can be associated with a second set of search attributes 452 and 462. The second set of amenities 440 can represent amenities suitable for different groups or age ranges of children. For example, the second set of amenities 440 can include a first group of amenities 450 corresponding to infant children (e.g., under the age of 1) including cribs of different types, a high chair, and so forth. The second set of amenities 440 can include a second group of amenities 460 corresponding to children (e.g., over the age of 1) including a playroom, a playground, an arcade machine, and so forth.

In this case, the second set of search attributes 452 and 462 can represent ages of one or more children. The amenity component 240 can receive the search attribute from the search criteria component 220 and can determine whether or not the search attribute includes ages that corresponds to the second set of search attributes 452 and/or 462. For example, the amenity component 240 can determine if the search attribute specifies a child age under the age of 1 and, if so, the amenity component 240 can determine that the first group of amenities 450 need to be included in the second set of amenities 440 returned back to the search criteria component 220. In addition, or in the alternative, the amenity component 240 can determine if the search attribute specifies a child age over the age of 1 and, if so, the amenity component 240 can determine that the second group of amenities 460 need to be included in the second set of amenities 440 returned back to the search criteria component 220. The amenity component 240 can determine that the search attribute received from the search criteria component 220 satisfies the amenity criterion associated with presentation of the second set of amenities 440 or portion thereof.

The amenity component 240 can, in response, provide the list of second set of amenities 440 back to the search criteria component 220.

The search criteria component 220 can then compare the second set of amenities 440 with a list of amenities available or associated with listing information for each listing that matches the search criteria. The search criteria component 220 can determine that a given listing is associated with listing information that includes a given amenity in the second set of amenities 440. The search criteria component 220 can then include a representation or indicator of the given amenity in a graphical object that represents the given listing.

In some examples, the table 400 can include one or more additional amenities 570 that are associated with the second set of search attributes 452 and 462. The one or more additional amenities 570 can be provided to the search criteria component 220 with a condition for presenting the one or more additional amenities 570. For example, the condition can specify that a representation and/or indicator of the one or more additional amenities 570 can be included in a given graphical object for a listing if the listing is associated with listing information that includes one or more of the second set of amenities 440. For example, if the given listing is determined to include the given amenity, the search criteria component 220 can determine if the given listing also include an additional amenity corresponding to the one or more additional amenities 570, such as amenity 572. If so, the search criteria component 220 can then present an additional indicator or representation for the additional amenity 570 together with the indicator or representation of the given amenity in the graphical object.

If a particular listing includes listing information with amenities in the first group of amenities 450 and the second group of amenities 460 for which both the second set of search attributes 452 and 462 are present (e.g., a search for both children under the age of 1 and children over the age of 1 is included in the search criteria), the search criteria component 220 can select a subset of amenities from the first group of amenities 450 and also a subset of amenities from the second group of amenities 460 to include as a representation or indicator in the graphical object. In some cases, the graphical object is limited to presenting a maximum of three amenities. In such cases, the search criteria component 220 selects two amenities from the first group of amenities 450 and one amenity from the second group of amenities 460 to present in the graphical object for a given listing having amenities in both groups and for which the search criteria included children under the age of 1 and over the age of 1.

Figure 5:
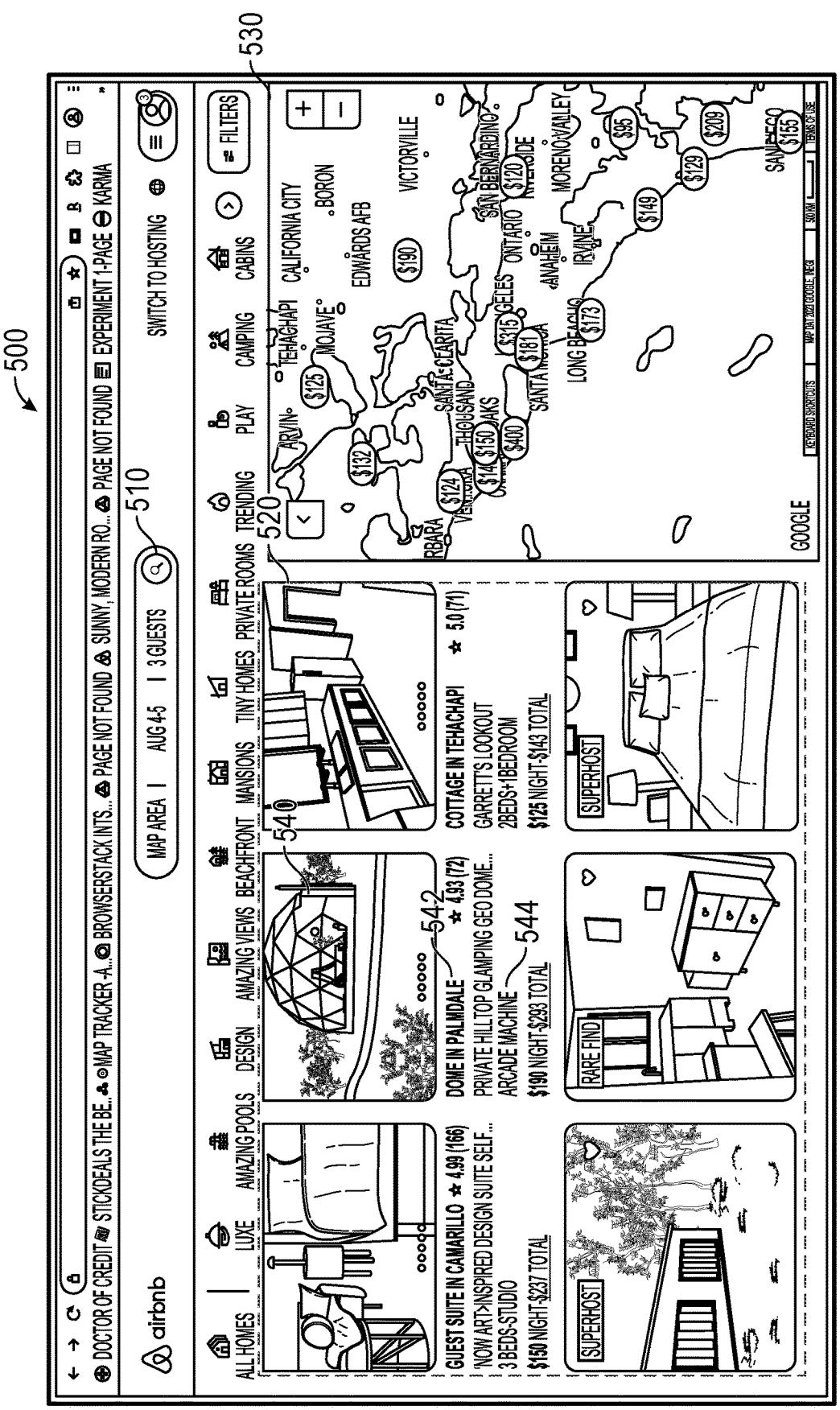

For example, as shown in FIG. 5, a GUI 500 is presented that includes a search input region 510, a results display 520, and a map display 530. The results display 520 can be generated by the search criteria component 220 based on processing search criteria received in the search input region 510. The search criteria component 220 can include various graphical objects in the results display 520 each associated with a listing that has listing information matching the search criteria received in the search input region 510.

In some examples, the search criteria component 220 can present a first graphical object 540 that includes an image or video associated with a corresponding first listing along with a description 542 of the first listing. The search criteria component 220 can determine that a first graphical object 540 is associated with a listing having listing information that includes an amenity matching the second group of amenities 460 received in the list of the second set of amenities 440 from the amenity component 240. In such cases, the first graphical object 540 is modified to include a representation or indicator 544 of the amenity matching the second group of amenities 460.

The search criteria component 220 can present in the map display 530 a list of pins or indicators of locations associated with each listing in the results display 520. Specifically, the search criteria component 220 can display a map in the map display 530 at a particular zoom level. The search criteria component 220 can access location information from each listing in the results display 520. The search criteria component 220 can access a cost or price associated with each listing in the results display 520. The search criteria component 220 can then generate a pin or identifier for each listing and place that pin or identifier at a particular location on the map in the map display 530 associated with the location information of the listing. This identifies to a user visually where on a given region of a map different listing search results match the search criteria. The pin or identifier that is displayed can provide a price or cost associated with the respective listing.

Figure 6:
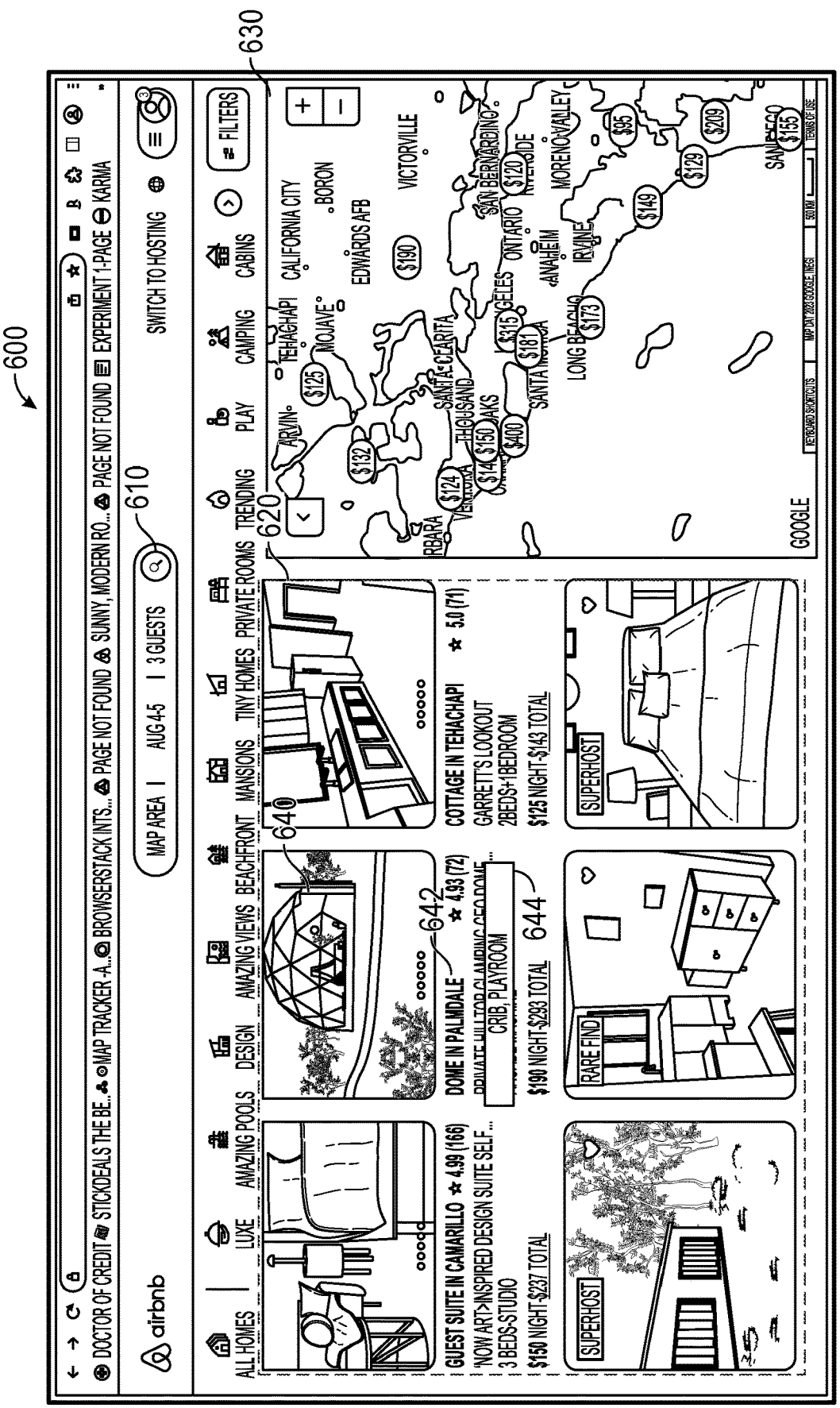

For example, as shown in FIG. 6, a GUI 600 is presented that includes a search input region 610, a results display 620, and a map display 630. The results display 620 can be generated by the search criteria component 220 based on processing search criteria received in the search input region 610. The search criteria component 220 can include various graphical objects in the results display 620 each associated with a listing that has listing information matching the search criteria received in the search input region 610.

In some examples, the search criteria component 220 can present a second graphical object 640 that includes an image or video associated with a corresponding second listing along with a description 642 of the second listing. The search criteria component 220 can determine that a second graphical object 640 is associated with a listing having listing information that includes an amenity matching the first group of amenities 450 and the second group of amenities 460 received in the list of the second set of amenities 440 from the amenity component 240. In such cases, the second graphical object 640 is modified to include a representation or indicator 644 of some of the amenities from each group. Namely, the search criteria can specify a search attribute that defines one or more children under the age of 1 and one or more children over the age of 1. In such cases, the amenity component 240 can determine that the amenity criterion is satisfied and can provide the second set of amenities 440 that includes the first group of amenities 450 and the second group of amenities 460. The search criteria component 220 can determine that the listing information for the second graphical object 640 includes one amenity from the second set of amenities 440 and one amenity from the first group of amenities 450. In response, the search criteria component 220 can present indicators of both the one amenity from the second set of amenities 440 and one amenity from the first group of amenities 450 in the indicator 644.

As discussed above, the search criteria component 220 can present in the map display 630 a list of pins or indicators of locations associated with each listing in the results display 620.

Figure 7:
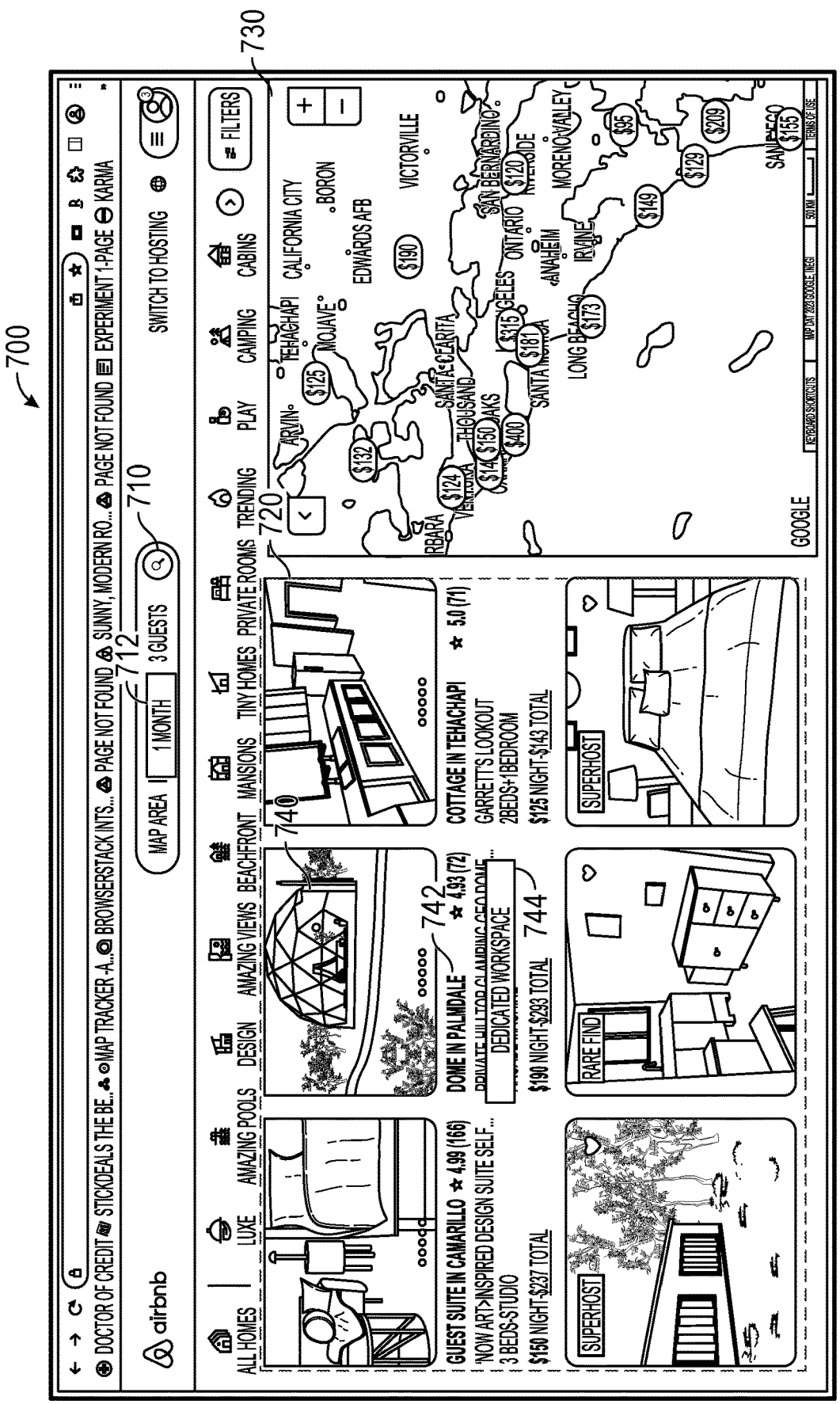

For example, as shown in FIG. 7, a GUI 700 is presented that includes a search input region 710, a results display 720, and a map display 730. The results display 720 can be generated by the search criteria component 220 based on processing search criteria received in the search input region 710. The search criteria in the search input region 710 can specify a search attribute 712 (e.g., defining a minimum duration of stay of one month). The search criteria component 220 can include various graphical objects in the results display 720 each associated with a listing that has listing information matching the search criteria received in the search input region 710.

In some examples, the search criteria component 220 can present a third graphical object 740 that includes an image or video associated with a corresponding third listing along with a description 742 of the third listing. The search criteria component 220 can receive an indication from the amenity component 240 that an amenity criterion (e.g., a minimum length of stay) matches one or more attributes, such as the search attribute 712 in the search criteria. In such cases, the amenity component 240 can provide the first set of amenities 430 to the search criteria component 220. The search criteria component 220 can determine that a third graphical object 740 is associated with a listing having listing information that includes an amenity matching the first set of amenities 430 received from the amenity component 240. In such cases, the third graphical object 740 is modified to include a representation or indicator 744 of some of the amenities first set of amenities 430. As discussed above, the search criteria component 220 can present in the map display 730 a list of pins or indicators of locations associated with each listing in the results display 720.

Figure 8:
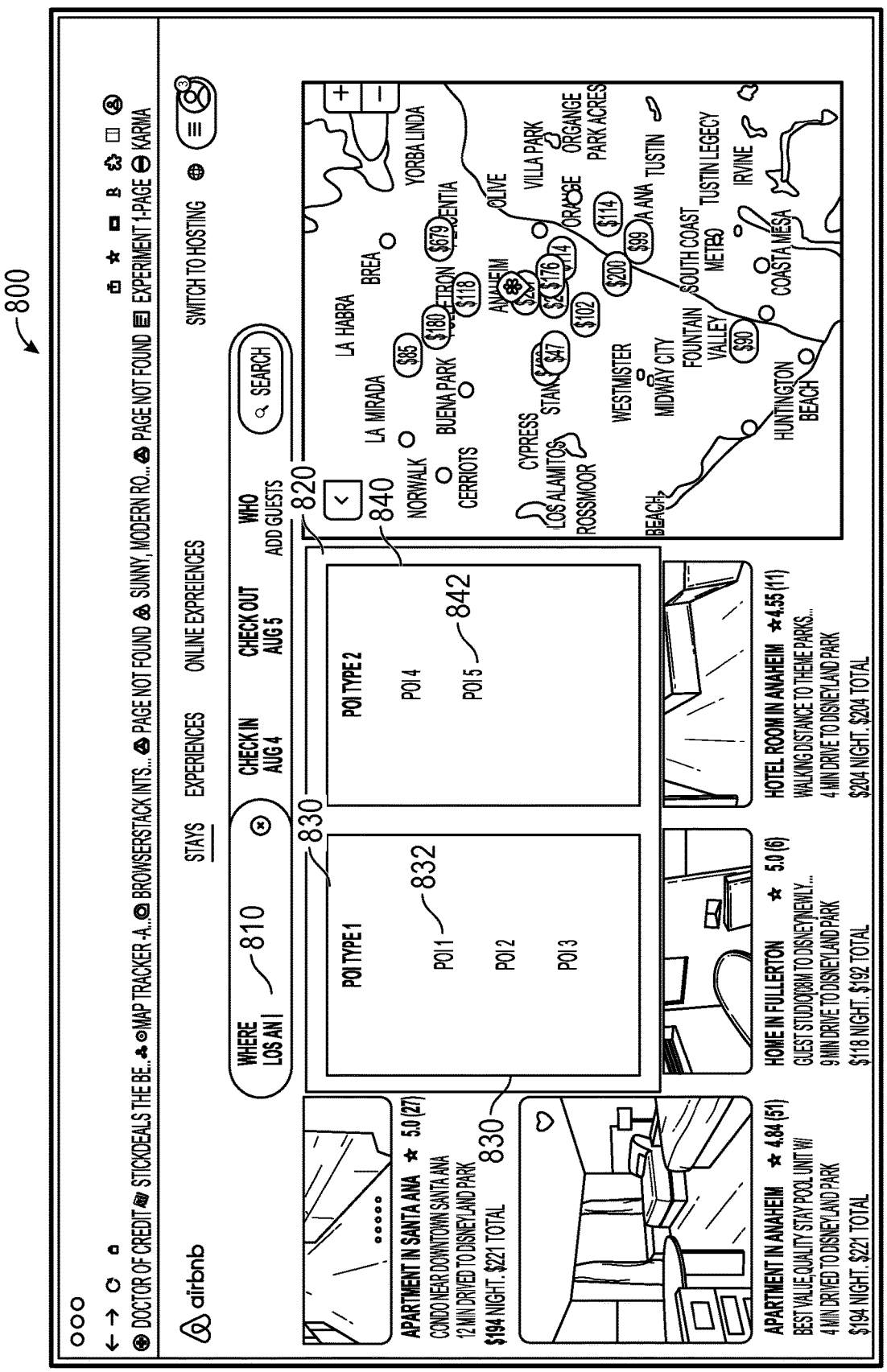

FIG. 8 shows a GUI 800 of an autocomplete search results display for a search input that is received, according to some examples. Specifically, the search criteria component 220 can continuously monitor characters that are being typed into the GUI 800 of the client device 110. The search criteria component 220 can continuously search a list of POIs based on one or more partially complete words of the search criteria as the search criteria is being input. The search criteria component 220 can search different types of POIs and organize the different types of POIs into a window 820 for presentation to a user of the client device 110 next to a search input region 810 in which the search criteria is input. In this way, as the user types in characters of the search criteria, preliminary results are presented to the user to allow the user to autocomplete the search criteria.

For example, if the user is typing in the word "los an," the search criteria component 220 can initiate a search for the POIs and identify a plurality of POIs associated with a portion of the incomplete word that is typed in "los an" corresponding to the complete word "Los Angeles." The search criteria component 220 can communicate the incomplete word to the POI component 260. The POI component 260 can identify a first set of POIs of a first type, such as a location (e.g., a city name, a popular or trending street address, a country name, and so forth) associated with the portion of the incomplete word. Concurrently, the POI component 260 can identify a second set of POIs of a second type, such as a landmark (e.g., a historical site, museum, a popular restaurant, a theater, and so forth) associated with the portion of the incomplete word. Concurrently, the POI component 260 can identify a third set of POIs of a third type, such as trending home styles (e.g., a mansion, a mini home, a mobile home, and so forth) associated with the portion of the incomplete word. The POI component 260 can provide that list of POIs back to the search criteria component 220. The search criteria component 220 can generate a window 820 that is divided into a plurality of regions 830 and 840 each associated with a different type of POI. The search criteria component 220 can present the window 820 adjacent to the search input region 810 of the client device 110 from which the incomplete word has been received. The window 820 can present to the user the first, second, and third types of POIs associated with the incomplete word and organized into the different regions 830 and 840 of the window 820.

For example, the window 820 includes the first region 830 that lists a first set of POIs matching the incomplete word in the search criteria. The first set of POIs can be of a first type. Input can be received that selects a given POI 832 from the first set of POIs in the first region 830. In response, the search criteria is replaced and/or supplemented with the selected given POI 832. In this case, the search results that are presented include listings that match or have attributes that match the given POI. As another example, the window 820 includes the second region 840 that lists a second set of POIs matching the incomplete word in the search criteria. The second set of POIs can be of a second type. Input can be received that selects a particular POI 842 from the second set of POIs in the second region 840. In response, the search criteria is replaced and/or supplemented with the selected POI 842. In this case, the search results that are presented include listings that match or have attributes that match the POI 842.

Figure 9:
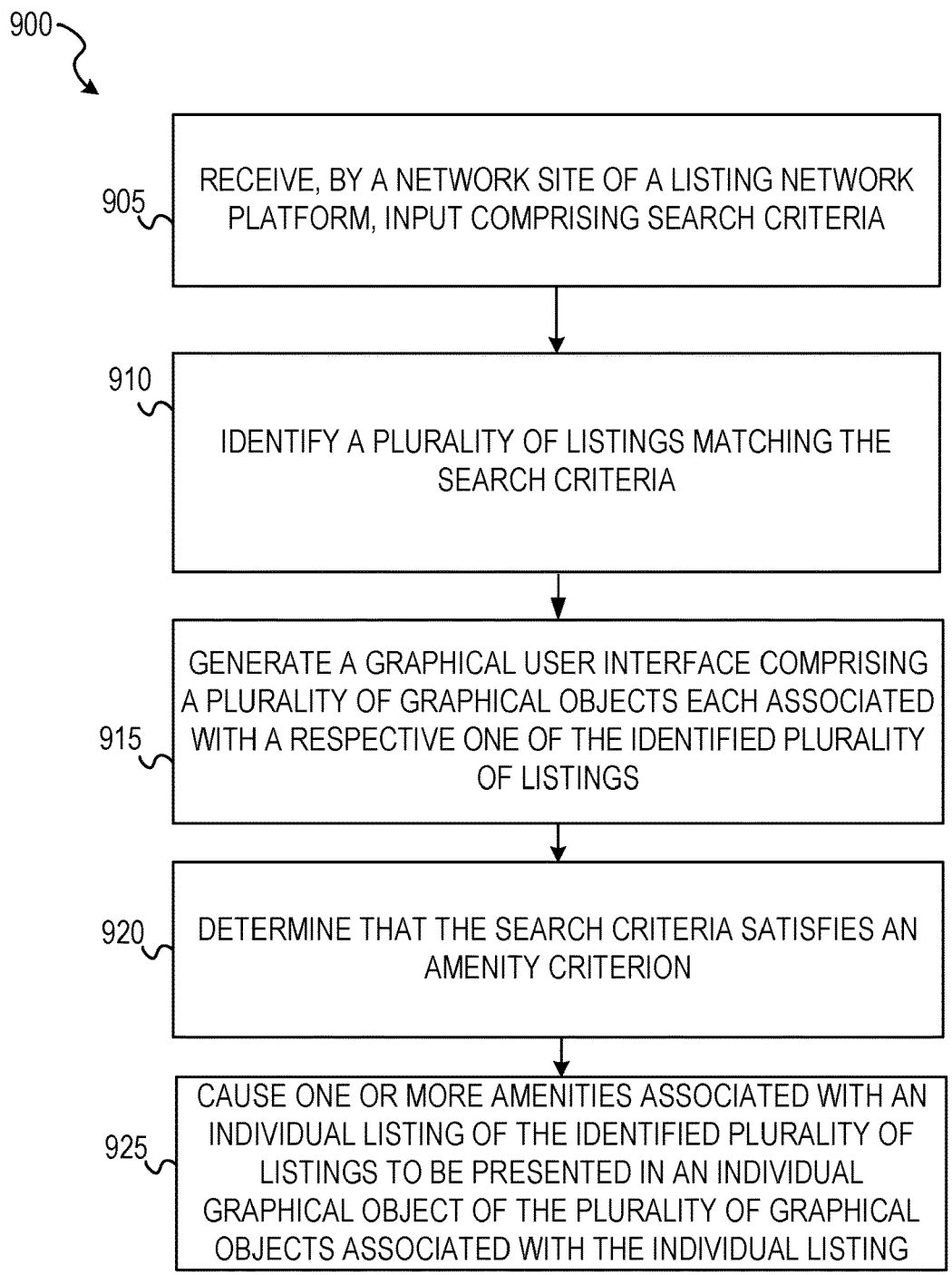
FIG. 9 shows a flow diagram of various processes and methods for searching listings on the listing network site, according to some example embodiments.

FIG. 9 shows a flow diagram of various processes and methods 900 for searching a listing network site, according to some examples. These processes and methods 900 can be performed by any component discussed above or below, such as the listing search system 150.

At operation 905, the listing search system 150 receives, by a network site of a listing network platform, input comprising search criteria, as discussed above.

At operation 910, the listing search system 150 identifies a plurality of listings matching the search criteria, as discussed above.

At operation 915, the listing search system 150 generates a graphical user interface comprising a plurality of graphical objects each associated with a respective one of the identified plurality of listings, as discussed above.

At operation 920, the listing search system 150 determines that the search criteria satisfies an amenity criterion, as discussed above.

At operation 925, the listing search system 150, in response to determining that the search criteria satisfies the amenity criterion, causes one or more amenities associated with an individual listing of the identified plurality of listings to be presented in an individual graphical object of the plurality of graphical objects associated with the individual listing.

In some examples, the individual graphical object includes an image representing a property associated with the individual listing and the individual graphical object includes a textual description of the property. The one or more amenities can be included as part of the textual description.

In some examples, the listing search system 150 displays, in the graphical user interface, a map representing locations associated with properties corresponding to the identified plurality of listings, the map being presented concurrently with the plurality of graphical objects. In some examples, the listing search system 150 retrieves amenity identifiers associated with the amenity criterion. In some cases, the listing search system 150 accesses amenity information associated with each of the identified plurality of listings. The listing search system 150 determines that the amenity information for the individual listing includes the one or more amenities matching one or more of the amenity identifiers. The one or more amenities can be presented in response to determining that the amenity information for the individual listing includes the one or more amenities.

In some examples, the listing search system 150 accesses an amenity table that associates search attributes with one or more amenity identifiers. The listing search system 150 retrieves a search attribute from the search criteria and searches the amenity table to determine whether one or more of the search attributes in the amenity table match the search attribute from the search criteria. In some examples, the amenity criterion is determined to be satisfied in response to determining that one or more of the search attributes in the amenity table match the search attribute from the search criteria.

In some examples, the listing search system 150 retrieves an amenity identifier associated with the one or more of the search attributes in the amenity table that match the search attribute from the search criteria. In some cases, a first search attribute of the search attributes stored in the amenity table includes a threshold duration of stay, the first search attribute being associated with a first amenity. A second search attribute of the search attributes stored in the amenity table includes an age of a child, the second search attribute being associated with a second amenity.

In some examples, the first amenity includes a dedicated workspace, electric vehicle charger, or high-speed Internet connectivity, and wherein the second amenity includes at least one of a crib, infant equipment, playground, children books and toys, children sporting equipment, or child entertainment equipment. In some cases, a third search attribute of the search attributes stored in the amenity table includes a specified location type, the third search attribute being associated with a third amenity.

In some examples, the listing search system 150 determines that the amenity information for the individual listing includes multiple amenities matching multiple of the amenity identifiers. The listing search system 150 determines that a quantity of the multiple amenities included in the individual listing transgresses a maximum quantity threshold. The maximum quantity threshold can define a maximum number of amenities available for inclusion in the individual graphical object. The listing search system 150, in response determining that the quantity of the multiple amenities included in the individual listing transgresses the maximum quantity threshold, selects a subset of the multiple amenities for inclusion in the individual graphical object.

In some examples, the listing search system 150 defines the search criteria to include one or more search attributes, the search attributes including at least one of a length of stay and age of one or more children. In some cases, the listing search system 150, as the input including the search criteria is received, searches for points of interest (POIs) associated with one or more portions of the search criteria; and automatically completing the one or more portions of the search criteria to present a window adjacent to a region in which the input including the search criteria is received. The window can include graphical indicators of one or more POIs associated with one or more portions of the search criteria.

In some examples, the listing search system 150 presents walk and drive distances for one or more of the POIs relative to locations corresponding to the identified plurality of listings. In some cases, the listing search system 150 causes a walk and drive distance to a given one of the POIs to be displayed in the individual graphical object. The walk and drive distance can be computed based on a distance between a property corresponding to the individual listing and the given one of the POIs.

In some examples, the listing search system 150 detects a location represented by the one or more portions of the search criteria. The listing search system 150 identifies, based on the location, the one or more POIs based on a plurality of factors, the plurality of factors including trending information associated with each of the one or more POIs, quantity of bookings or viewings of listings within a threshold distance of the one or more POIs, quantity of available listings within the threshold distance of the one or more POIs, or a user profile. In some examples, the listing search system 150 divides the window into a plurality of regions. Each region of the plurality of regions can represent a different type of POI of the one or more POIs.

Figure 10:
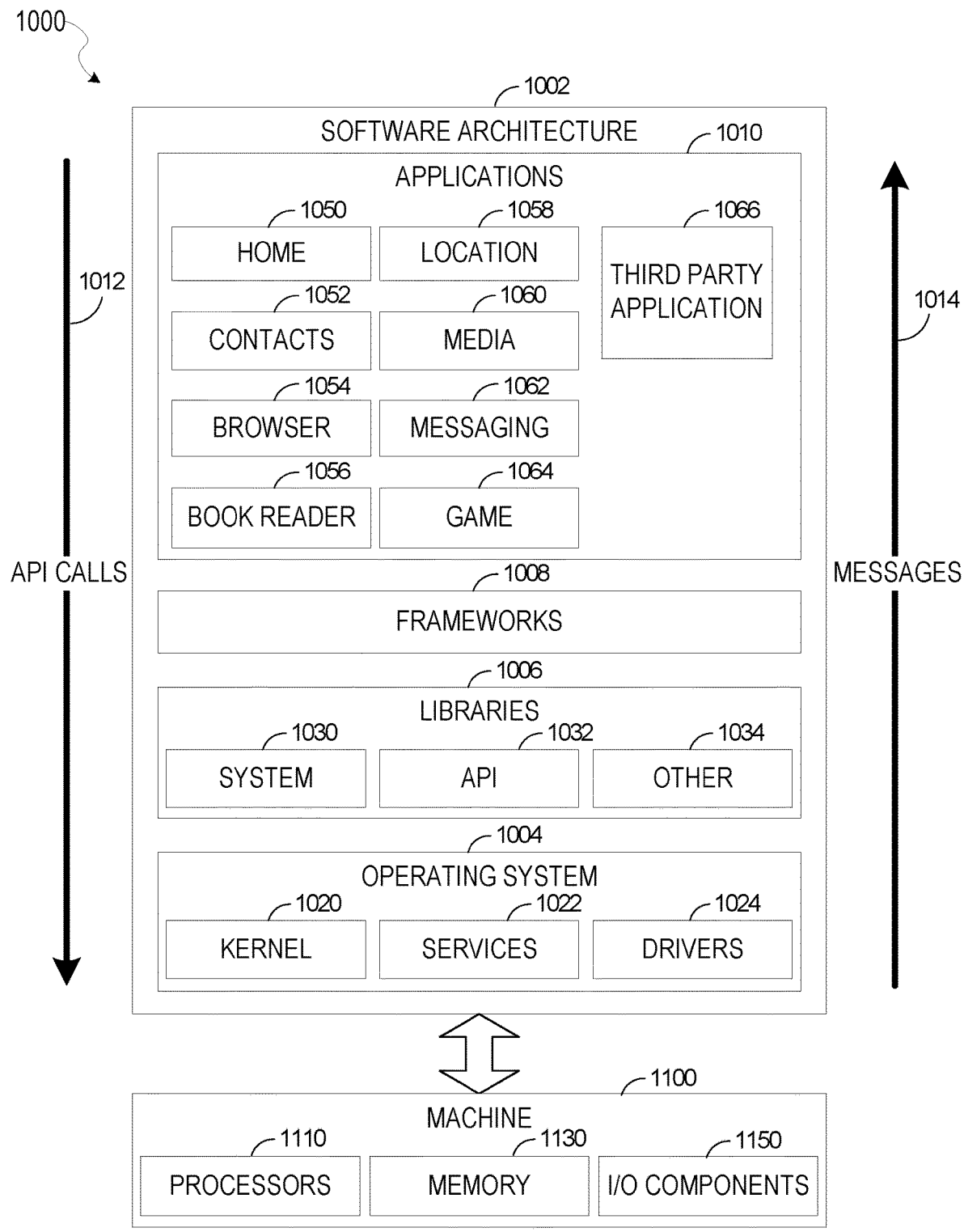
FIG. 10 is a block diagram illustrating the architecture of software used to implement the disclosed system, according to some examples.

FIG. 10 is a block diagram 1000 illustrating an architecture of software 1002, which can be installed on any one or more of the devices described above. FIG. 10 is merely a non-limiting example of a software architecture, and it will be appreciated that many other architectures can be implemented to facilitate the functionality described herein. In various embodiments, the software 1002 is implemented by hardware such as a machine 1100 of FIG. 11 that includes processors 1110, memory 1130, and input/output (I/O) components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate the functionality described herein.

Figure 11:
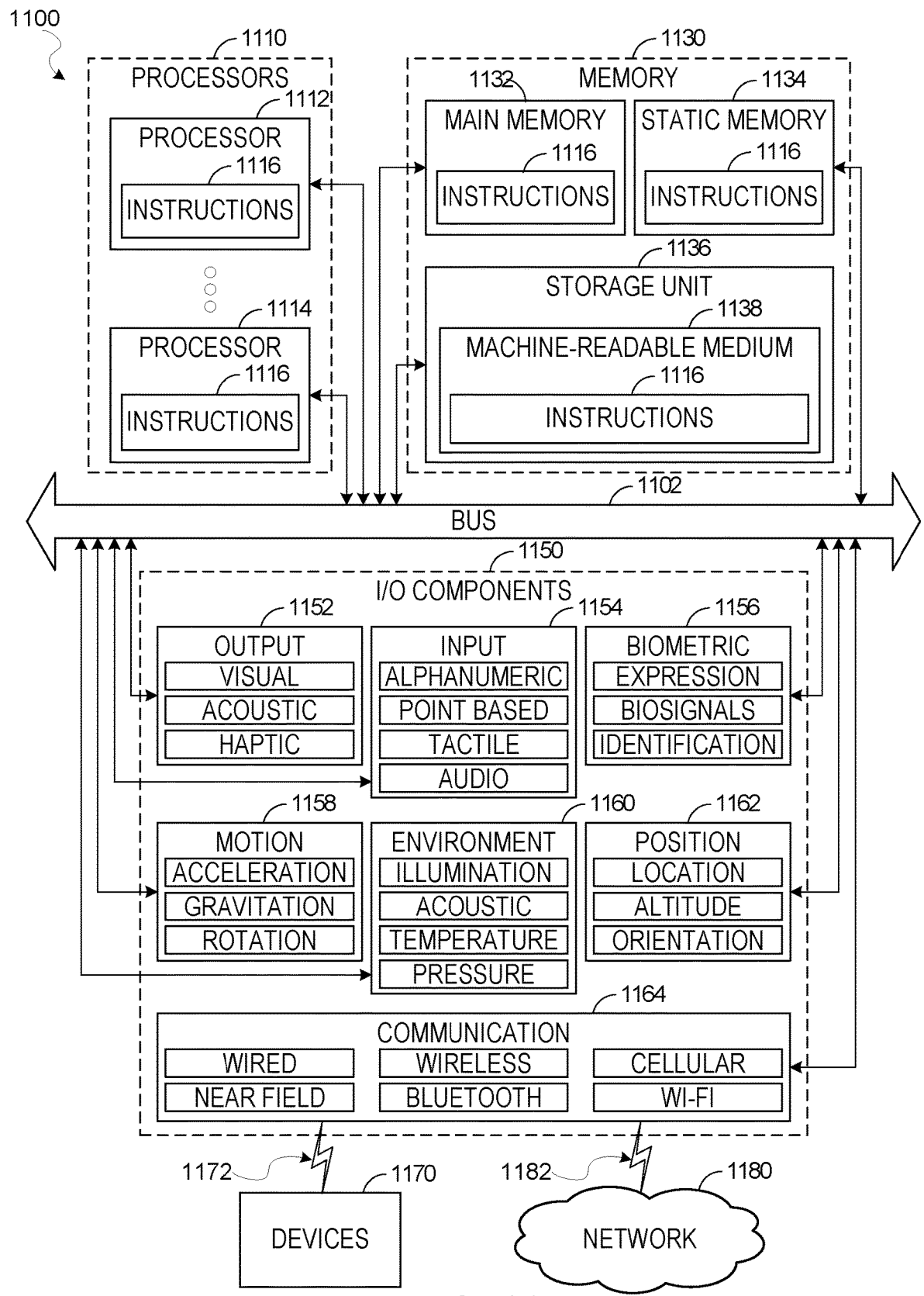
FIG. 11 shows a machine as an example computer system with instructions to cause the machine to implement the disclosed system, according to some examples.

FIG. 11 illustrates a diagrammatic representation of a machine 1100 in the form of a computer system within which a set of instructions may be executed for causing the machine to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a PC, a tablet computer, a laptop computer, a netbook, an STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 may include a main memory 1132, a static memory 1134, and a storage unit 1136, all accessible to the processors 1110 such as via the bus 1102. The main memory 1132, the static memory 1134, and storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

The various memories (i.e., 1130, 1132, 1134, and/or memory of the processor(s) 1110) and/or storage unit 1136 may store one or more sets of instructions and data structures (e.g., software) embodying or utilized by any one or more of the methodologies or functions described herein. These instructions (e.g., the instructions 1116), when executed by processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a VPN, an LAN, a WLAN, a WAN, a WWAN, an MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

What is claimed is:

1. A method performed by one or more processors of a listing search system in a listing network platform, the method comprising:

receiving, by a network site of the listing network platform, input comprising search criteria;

identifying a plurality of listings matching the search criteria;

generating, by the one or more processors of the listing search system in the listing network platform, a graphical user interface comprising a plurality of graphical objects each associated with a respective one of the identified plurality of listings;

determining that the search criteria satisfies an amenity criterion;

retrieving amenity identifiers associated with the amenity criterion;
accessing amenity information associated with each of the identified plurality of listings;
determining that the amenity information for an individual listing of the plurality of listings includes one or more amenities matching one or more of the amenity identifiers;
in response to determining that the amenity information for the individual listing includes the one or more amenities, causing the one or more amenities associated with the individual listing to be presented in an individual graphical object of the plurality of graphical objects associated with the individual listing;
modifying one or more display attributes of the individual graphical object associated with the individual listing in response to determining that the amenity information for the individual listing includes the one or more amenities; and
preventing an additional graphical object, associated with an additional listing of the plurality of listings, from being modified to include a representation of the one or more amenities in response to determining that the amenity information for the additional listing excludes the one or more amenities.

2. The method of claim 1, wherein the individual graphical object comprises an image representing a property associated with the individual listing, and wherein the individual graphical object comprises a textual description of the property, the one or more amenities being included as part of the textual description.

3. The method of claim 1, further comprising:
displaying, in the graphical user interface, a map representing locations associated with properties corresponding to the identified plurality of listings, the map being presented concurrently with the plurality of graphical objects.

4. The method of claim 1, further comprising:
accessing an amenity table that associates search attributes with one or more amenity identifiers;
retrieving a search attribute from the search criteria; and
searching the amenity table to determine whether one or more of the search attributes in the amenity table match the search attribute from the search criteria.

5. The method of claim 4, wherein the amenity criterion is determined to be satisfied in response to determining that one or more of the search attributes in the amenity table match the search attribute from the search criteria.

6. The method of claim 4, further comprising retrieving an amenity identifier associated with the one or more of the search attributes in the amenity table that match the search attribute from the search criteria.

7. The method of claim 4, wherein a first search attribute of the search attributes stored in the amenity table comprises a threshold duration of stay, the first search attribute being associated with a first amenity, and wherein a second search attribute of the search attributes stored in the amenity table comprises an age of a child, the second search attribute being associated with a second amenity.

8. The method of claim 7, wherein the first amenity comprises a dedicated workspace, electric vehicle charger, or high-speed Internet connectivity, and wherein the second amenity comprises at least one of a crib, infant equipment, playground, children's books and toys, children sporting equipment, or children entertainment equipment.

9. The method of claim 7, wherein a third search attribute of the search attributes stored in the amenity table comprises a specified location type, the third search attribute being associated with a third amenity.

10. The method of claim 1, further comprising:
determining that the amenity information for the individual listing includes multiple amenities matching multiple of the amenity identifiers, the multiple amenities comprising a first group of amenities and a second group of amenities;
determining that a quantity of the multiple amenities included in the individual listing transgresses a maximum quantity threshold, the maximum quantity threshold defining a maximum number of amenities available for inclusion in the individual graphical object; and
in response determining that the quantity of the multiple amenities included in the individual listing transgresses the maximum quantity threshold, selecting a first subset of amenities from the first group of amenities and a second subset of amenities from the second group of amenities for display in the individual graphical object.

11. The method of claim 1, further comprising:
defining the search criteria to include one or more search attributes, the one or more search attributes comprising at least one of a length of stay and age of one or more children.

12. The method of claim 11, further comprising:
as characters of the input comprising the search criteria are received, searching for points of interest (POIs) associated with one or more portions of the search criteria; and
automatically completing the one or more portions of the search criteria to present a window adjacent to a region in which the input comprising the search criteria is received, the window comprising graphical indicators of one or more POIs associated with one or more portions of the search criteria.

13. The method of claim 12, further comprising:
presenting walk and drive distances for one or more of the POIs relative to locations corresponding to the identified plurality of listings.

14. The method of claim 12, further comprising:
causing a walk and drive distance to a given one of the POIs to be displayed in the individual graphical object, the walk and drive distance being computed based on a distance between a property corresponding to the individual listing and the given one of the POIs.

15. The method of claim 12, further comprising:
detecting a location represented by the one or more portions of the search criteria; and
identifying, based on the location, the one or more POIs based on a plurality of factors, the plurality of factors comprising trending information associated with each of the one or more POIs, quantity of bookings or viewings of listings within a threshold distance of the one or more POIs, quantity of available listings within the threshold distance of the one or more POIs, or a user profile.

16. The method of claim 12, further comprising:
dividing the window into a plurality of regions, wherein each region of the plurality of regions representing a different type of POI of the one or more POIs.

17. A listing search system of a listing network platform comprising:
one or more processors of a machine; and
a memory storing instruction that, when executed by the one or more processors, cause the machine to perform operations comprising:

receiving, by a network site of the listing network platform, input comprising search criteria;

identifying a plurality of listings matching the search criteria;

generating, by the listing search system of the listing network platform, a graphical user interface comprising a plurality of graphical objects each associated with a respective one of the identified plurality of listings;

determining that the search criteria satisfies an amenity criterion;

retrieving amenity identifiers associated with the amenity criterion;

accessing amenity information associated with each of the identified plurality of listings;

determining that the amenity information for an individual listing of the plurality of listings includes one or more amenities matching one or more of the amenity identifiers;

in response to determining that the amenity information for the individual listing includes the one or more amenities, causing the one or more amenities associated with the individual listing to be presented in an individual graphical object of the plurality of graphical objects associated with the individual listing;

modifying one or more display attributes of the individual graphical object associated with the individual listing in response to determining that the amenity information for the individual listing includes the one or more amenities; and preventing an additional graphical object, associated with an additional listing of the plurality of listings, from being modified to include a representation of the one or more amenities in response to determining that the amenity information for the additional listing excludes the one or more amenities.

18. A non-transitory machine-readable storage device embodying instructions that, when executed by a machine implementing a listing search system of a listing network platform, cause the machine to perform operations comprising:

receiving, by a network site of the listing network platform, input comprising search criteria;

identifying a plurality of listings matching the search criteria;

generating, by the listing search system of the listing network platform, a graphical user interface comprising a plurality of graphical objects each associated with a respective one of the identified plurality of listings;

determining that the search criteria satisfies an amenity criterion;

retrieving amenity identifiers associated with the amenity criterion;

accessing amenity information associated with each of the identified plurality of listings;

determining that the amenity information for an individual listing of the plurality of listings includes one or more amenities matching one or more of the amenity identifiers;

in response to determining that the amenity information for the individual listing includes the one or more amenities, causing the one or more amenities associated with the individual listing to be presented in an individual graphical object of the plurality of graphical objects associated with the individual listing;

modifying one or more display attributes of the individual graphical object associated with the individual listing in response to determining that the amenity information for the individual listing includes the one or more amenities; and preventing an additional graphical object, associated with an additional listing of the plurality of listings, from being modified to include a representation of the one or more amenities in response to determining that the amenity information for the additional listing excludes the one or more amenities.

\* \* \* \* \*